(12) United States Patent
Lewis et al.

(10) Patent No.: US 8,500,066 B2
(45) Date of Patent: Aug. 6, 2013

(54) METHOD AND APPARATUS FOR WIRELESS AIRCRAFT COMMUNICATIONS AND POWER SYSTEM USING FUSELAGE STRINGERS

(75) Inventors: Dennis Michael Lewis, Lynnwood, WA (US); William Preston Geren, Shoreline, WA (US); Jason P. Bommer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 1006 days.

(21) Appl. No.: 12/484,151

(22) Filed: Jun. 12, 2009

(65) Prior Publication Data

US 2010/0318243 A1 Dec. 16, 2010

(51) Int. Cl.
*B64C 1/00* (2006.01)

(52) U.S. Cl.
USPC .............................. 244/119; 343/708; 343/705

(58) Field of Classification Search
None
See application file for complete search history.

(56) References Cited

U.S. PATENT DOCUMENTS

| | | | |
|---|---|---|---|
| 1,987,337 A | 1/1935 | Hammerling | |
| 2,491,418 A | 12/1949 | Schlesman | |
| 2,561,756 A * | 7/1951 | Shook | 362/495 |
| 2,593,714 A | 4/1952 | Robinson | |
| 2,630,472 A | 3/1953 | Mcarthur | |
| 3,028,292 A | 4/1962 | Hisids et al. | |
| 3,205,288 A | 9/1965 | Bates | |
| 3,390,393 A * | 6/1968 | Upton | 343/708 |
| 3,421,336 A | 1/1969 | Lichtenberger et al. | |
| 3,530,021 A | 9/1970 | Reichl | |
| 3,779,487 A | 12/1973 | Ashton et al. | |
| 3,963,425 A | 6/1976 | Sambrook | |
| 3,979,005 A | 9/1976 | Robinson et al. | |
| 4,019,291 A | 4/1977 | Ernst | |
| 4,053,667 A | 10/1977 | Smith | |
| 4,079,903 A | 3/1978 | Ashton et al. | |
| 4,197,545 A | 4/1980 | Favaloro et al. | |
| 4,510,500 A | 4/1985 | Brune | |
| 4,538,780 A | 9/1985 | Roe | |
| 4,776,907 A | 10/1988 | Massions | |
| 4,792,493 A | 12/1988 | Bertram et al. | |
| 5,170,666 A | 12/1992 | Larsen | |
| 5,184,141 A * | 2/1993 | Connolly et al. | 343/705 |
| 5,197,697 A * | 3/1993 | Lyloc et al. | 244/197 |
| 5,222,166 A | 6/1993 | Weltha | |

(Continued)

FOREIGN PATENT DOCUMENTS

| DE | 1949209 A1 | 4/1971 |
|---|---|---|
| EP | 0215698 A2 | 3/1987 |

(Continued)

OTHER PUBLICATIONS

"Communication and Power through Structural Airframe Stringers for On-board Wireless Sensors", pp. 1-10 retrieved Jun. 18, 2009 from: https://sql-pw-01.nw.nos.boeing.com/structures/StratProjects/bp1_12_18_08/BTEC2009WirelessBusDraft12.17.08.pdf.

(Continued)

*Primary Examiner* — Tien Dinh
*Assistant Examiner* — Michael A Fabula
(74) *Attorney, Agent, or Firm* — Yee & Associates, P.C.

(57) ABSTRACT

A method and apparatus for transmitting wireless signals. An apparatus comprises a stringer having a channel and a waveguide located within the channel. The waveguide is capable of carrying a number of wireless signals.

23 Claims, 7 Drawing Sheets

U.S. PATENT DOCUMENTS

| | | | |
|---|---|---|---|
| 5,242,523 A | 9/1993 | Willden et al. | |
| 5,255,880 A * | 10/1993 | Lyloc et al. | 244/197 |
| 5,268,392 A | 12/1993 | Bertram | |
| 5,271,986 A | 12/1993 | Dublinski et al. | |
| 5,332,178 A | 7/1994 | Williams | |
| 5,348,601 A | 9/1994 | Ray | |
| 5,363,464 A * | 11/1994 | Way et al. | 385/125 |
| 5,403,424 A | 4/1995 | Ehrat et al. | |
| 5,415,504 A | 5/1995 | Wolf et al. | |
| 5,419,139 A | 5/1995 | Blum et al. | |
| 5,438,330 A | 8/1995 | Yamazaki et al. | |
| 5,458,330 A | 10/1995 | Baum | |
| 5,527,414 A | 6/1996 | Dublinski et al. | |
| 5,624,622 A | 4/1997 | Boyce et al. | |
| 5,632,940 A | 5/1997 | Whatley | |
| 5,647,658 A * | 7/1997 | Ziadi | 362/471 |
| 5,854,336 A | 12/1998 | Divone, Sr. et al. | |
| 5,863,635 A | 1/1999 | Childress | |
| 5,958,550 A | 9/1999 | Childress | |
| 6,039,832 A | 3/2000 | McCarville | |
| 6,116,179 A | 9/2000 | Swinbanks et al. | |
| 6,117,376 A * | 9/2000 | Merkel | 264/46.5 |
| 6,159,414 A | 12/2000 | Tunis, III et al. | |
| 6,187,411 B1 | 2/2001 | Palmer | |
| 6,198,445 B1 * | 3/2001 | Alt et al. | 343/705 |
| 6,450,678 B1 * | 9/2002 | Bayersdorfer | 362/581 |
| 6,458,309 B1 | 10/2002 | Allen et al. | |
| 6,497,190 B1 * | 12/2002 | Lewit | 114/357 |
| 6,510,961 B1 | 1/2003 | Head et al. | |
| 6,529,127 B2 | 3/2003 | Townsend et al. | |
| 6,632,502 B1 | 10/2003 | Allen et al. | |
| 6,638,466 B1 | 10/2003 | Abbott | |
| 6,653,980 B2 * | 11/2003 | Ceccom et al. | 343/705 |
| 6,689,246 B2 | 2/2004 | Hirahara et al. | |
| 6,739,861 B2 | 5/2004 | Cournoyer et al. | |
| 6,755,998 B1 | 6/2004 | Reichard et al. | |
| 6,889,937 B2 | 5/2005 | Simpson et al. | |
| 6,949,282 B2 | 9/2005 | Obeshaw | |
| 6,960,993 B2 | 11/2005 | Mattes et al. | |
| 6,963,728 B2 | 11/2005 | Edwards et al. | |
| 6,999,857 B1 | 2/2006 | Kasper et al. | |
| 7,001,082 B2 | 2/2006 | Morrison | |
| 7,018,217 B2 | 3/2006 | Marshall et al. | |
| 7,063,763 B2 | 6/2006 | Chapman, Jr. | |
| 7,074,474 B2 | 7/2006 | Toi et al. | |
| 7,118,370 B2 | 10/2006 | Willden et al. | |
| 7,159,822 B2 | 1/2007 | Grantham et al. | |
| 7,205,956 B1 * | 4/2007 | Sychaleun et al. | 343/890 |
| 7,207,523 B2 | 4/2007 | Callahan et al. | |
| 7,216,832 B2 | 5/2007 | Simpson et al. | |
| 7,231,180 B2 | 6/2007 | Benson et al. | |
| 7,246,521 B2 * | 7/2007 | Kim | 73/587 |
| 7,263,889 B2 | 9/2007 | Kennedy et al. | |
| 7,268,517 B2 | 9/2007 | Rahmel et al. | |
| 7,276,703 B2 | 10/2007 | Berkcan et al. | |
| 7,277,822 B2 | 10/2007 | Blemel | |
| 7,281,318 B2 | 10/2007 | Marshall et al. | |
| 7,296,769 B2 | 11/2007 | Hogenson et al. | |
| 7,307,431 B2 | 12/2007 | Safai et al. | |
| 7,343,265 B2 | 3/2008 | Andarawis et al. | |
| 7,349,225 B1 * | 3/2008 | Bennett | 361/790 |
| 7,400,253 B2 | 7/2008 | Cohen | |
| 7,419,627 B2 | 9/2008 | Sheu et al. | |
| 7,513,769 B2 | 4/2009 | Benson et al. | |
| 7,719,416 B2 | 5/2010 | Arms et al. | |
| 7,749,421 B2 | 7/2010 | Callis et al. | |
| 7,830,523 B2 | 11/2010 | Bommer et al. | |
| 7,830,888 B2 | 11/2010 | Donovan | |
| 7,861,969 B2 | 1/2011 | Guzman et al. | |
| 7,864,039 B2 | 1/2011 | Georgeson | |
| 7,871,040 B2 | 1/2011 | Lee et al. | |
| 7,879,276 B2 * | 2/2011 | Guzman et al. | 264/248 |
| 7,963,815 B2 | 6/2011 | Mead | |
| 8,022,793 B2 * | 9/2011 | Olson et al. | 333/248 |
| 8,022,843 B2 | 9/2011 | Mitchell et al. | |
| 8,026,257 B2 | 9/2011 | Degnan et al. | |
| 8,026,857 B2 * | 9/2011 | Bommer | 343/708 |
| 8,042,767 B2 | 10/2011 | Velicki et al. | |
| 8,044,812 B2 | 10/2011 | Harres | |
| 8,083,182 B2 | 12/2011 | Cacciaguerra | |
| 8,094,062 B2 * | 1/2012 | Hook | 342/175 |
| 8,098,143 B2 | 1/2012 | Andarawis et al. | |
| 8,100,361 B2 * | 1/2012 | Grauerholz | 244/119 |
| 8,115,448 B2 | 2/2012 | John | |
| 8,128,030 B2 | 3/2012 | Dannenberg | |
| 8,154,402 B2 | 4/2012 | Tayrani et al. | |
| 8,234,924 B2 * | 8/2012 | Saxena et al. | 73/632 |
| 2001/0017336 A1 | 8/2001 | Hirahara et al. | |
| 2002/0011047 A1 | 1/2002 | Obeshaw | |
| 2002/0050925 A1 | 5/2002 | Arms et al. | |
| 2002/0178992 A1 * | 12/2002 | Lewit | 114/357 |
| 2003/0098520 A1 | 5/2003 | Cournoyer et al. | |
| 2003/0192990 A1 | 10/2003 | Simpson et al. | |
| 2003/0216149 A1 * | 11/2003 | Edwards et al. | 455/550.1 |
| 2004/0048582 A1 | 3/2004 | Mattes et al. | |
| 2004/0051214 A1 | 3/2004 | Sheu et al. | |
| 2004/0150529 A1 | 8/2004 | Benoit et al. | |
| 2004/0166408 A1 | 8/2004 | Anderson et al. | |
| 2005/0003145 A1 | 1/2005 | Toi et al. | |
| 2005/0056362 A1 | 3/2005 | Benson et al. | |
| 2005/0128028 A1 * | 6/2005 | Sanchez et al. | 333/157 |
| 2005/0186994 A1 | 8/2005 | Rahmel et al. | |
| 2005/0211843 A1 | 9/2005 | Simpson et al. | |
| 2005/0213548 A1 | 9/2005 | Benson et al. | |
| 2005/0230552 A1 | 10/2005 | Engwall et al. | |
| 2005/0259919 A1 | 11/2005 | Aldridge et al. | |
| 2006/0226287 A1 | 10/2006 | Grantham et al. | |
| 2007/0046298 A1 | 3/2007 | Safai et al. | |
| 2007/0090294 A1 | 4/2007 | Safai et al. | |
| 2007/0109121 A1 | 5/2007 | Cohen | |
| 2007/0114422 A1 | 5/2007 | Berkcan et al. | |
| 2007/0118335 A1 | 5/2007 | Andarawis et al. | |
| 2007/0145638 A9 | 6/2007 | Mead | |
| 2007/0151375 A1 | 7/2007 | Kennedy et al. | |
| 2007/0176840 A1 * | 8/2007 | Pristas et al. | 343/841 |
| 2008/0036617 A1 | 2/2008 | Arms et al. | |
| 2008/0089087 A1 | 4/2008 | Stoner | |
| 2008/0111024 A1 | 5/2008 | Lee et al. | |
| 2008/0157429 A1 | 7/2008 | Callis et al. | |
| 2008/0185478 A1 * | 8/2008 | Dannenberg | 244/119 |
| 2008/0226876 A1 | 9/2008 | Roth | |
| 2008/0290214 A1 | 11/2008 | Guzman et al. | |
| 2009/0057487 A1 | 3/2009 | Velicki et al. | |
| 2009/0058361 A1 | 3/2009 | John | |
| 2009/0101756 A1 | 4/2009 | Cacciaguerra | |
| 2009/0108211 A1 | 4/2009 | Bommer et al. | |
| 2009/0127393 A1 * | 5/2009 | Guzman et al. | 244/133 |
| 2009/0184877 A1 * | 7/2009 | Bommer | 343/708 |
| 2009/0243895 A1 | 10/2009 | Mitchell et al. | |
| 2009/0325628 A1 * | 12/2009 | Becker | 455/523 |
| 2010/0011865 A1 * | 1/2010 | Saxena et al. | 73/632 |
| 2010/0114383 A1 | 5/2010 | Rosca et al. | |
| 2010/0129589 A1 | 5/2010 | Senibi et al. | |
| 2010/0141377 A1 | 6/2010 | Andarawis et al. | |
| 2010/0176939 A1 | 7/2010 | Harres | |
| 2010/0231382 A1 | 9/2010 | Tayrani et al. | |
| 2010/0318243 A1 | 12/2010 | Lewis et al. | |
| 2011/0018686 A1 | 1/2011 | Fahley et al. | |
| 2011/0027526 A1 * | 2/2011 | McCarville et al. | 428/116 |
| 2011/0049935 A1 | 3/2011 | Locher et al. | |
| 2011/0076461 A1 | 3/2011 | Jacob et al. | |
| 2011/0080057 A1 | 4/2011 | Bowman et al. | |
| 2011/0088833 A1 | 4/2011 | Guzman et al. | |
| 2011/0111183 A1 | 5/2011 | Guzman et al. | |
| 2011/0139932 A1 | 6/2011 | Matheson et al. | |
| 2011/0188862 A1 | 8/2011 | Fuss et al. | |
| 2011/0250384 A1 | 10/2011 | Sumi et al. | |
| 2011/0254267 A1 | 10/2011 | Marengo | |
| 2012/0175464 A1 * | 7/2012 | Brownjohn et al. | 244/131 |

FOREIGN PATENT DOCUMENTS

| | | |
|---|---|---|
| GB | 1522432 A | 8/1978 |
| JP | 4329125 A | 11/1992 |
| JP | 2005291708 | 10/2005 |
| WO | 8601039 A1 | 2/1986 |
| WO | WO2004102056 | 11/2004 |
| WO | 2005096571 A1 | 10/2005 |

| | | |
|---|---|---|
| WO | WO 2005105402 A1 | 11/2005 |
| WO | WO2007041256 | 4/2007 |
| WO | 2008010841 A1 | 1/2008 |
| WO | WO 2008076020 A1 * | 6/2008 |
| WO | WO2009023346 | 2/2009 |
| WO | WO2009055218 | 4/2009 |
| WO | 2010040004 A1 | 4/2010 |
| WO | WO2010065330 | 6/2010 |
| WO | WO2010144248 | 12/2010 |
| WO | WO2011011110 | 1/2011 |
| WO | WO2011016931 | 2/2011 |

OTHER PUBLICATIONS

USPTO office action for U.S. Appl. No. 11/937,006 dated Dec. 30, 2009.
U.S. Appl. No. 12/508,281, filed Jul. 23, 2009, Fahley et al.
U.S. Appl. No. 12/534,356, filed Aug. 3, 2009, McCarville et al.
Greenhalgh et al., "The assessment of novel materials and processes for the impact tolerant design of stiffened composite aerospace structures", Composites: Part A 34, Copyright 2003, pp. 151-161.
O'Brien et al., "Assessment of Composite Delamination Self-Healing via Micro-Encapsulation", Proceedings of American Society for Composites 23rd Technical Conference, Sep. 2008, 18 pages.
USPTO Final Office Action dated Jul. 19, 2010 for U.S. Appl. No. 11/753,482, 14 pages.
USPTO Notice of Allowance dated Sep. 7, 2010 for U.S. Appl. No. 11/753,482, 9 pages.
USPTO Office Action dated May 31, 2011 for U.S. Appl. No. 12/277,483, 34 pages.
USPTO Office Action dated Oct. 31, 2011 for U.S. Appl. No. 13/005,786, 26 pages.
USPTO Office Action dated Nov. 10, 2011 for U.S. Appl. No. 12/508,281, 46 pages.
USPTO office action for U.S. Appl. No. 11/753,482 dated Mar. 31, 2010.
Seibert et al., "Applications for PMI foams in aerospace sandwich structures", Reinforced Plastics, Elsevier Advanced Technology, NY, vol. 50, No. 1, Jan. 2006, pp. 44-48.
Marasco et al., "Mechanical properties balance in novel Z-pinned sandwich panels: Out-of-Plane properties", Composites Part A: Applied Science and Manufacturing, Elsevier Science Publishers, Amsterdam, NL, vol. 37, No. 2, Feb. 2006, pp. 295-302.
Ko, "The future of sensor and actuator systems", Sensors and Actuators, Elsevier Sequoia S.A. Lausanne, CH vol. 56 No. 1, Aug. 1, 1996, pp. 193-197.
"How about this? Avionics would go in plane's skin", Electronics, VNU Business Puyblications, New York, US, vol. 60, No. 21, Oct. 15, 1987.
U.S. Appl. No. 12/016,018, filed Jan. 17, 2008, Bommer.
USPTO Final office action for U.S. Appl. No. 11/937,006 dated Jun. 22, 2010.
USPTO Notice of allowance for U.S. Appl. No. 11/937,006 dated Oct. 6, 2010.
USPTO Notice of allowance dated Dec. 2, 2010 for U.S. Appl. No. 11/937,006, 4 pages.
USPTO Office Action dated Jan. 4, 2011 for U.S. Appl. No. 12/016,018, 9 pages.
USPTO Office Action dated Jul. 9, 2010 for U.S. Appl. No. 12/016,018, 6 pages.
USPTO Notice of Allowance dated Jun. 27, 2011 for U.S. Appl. No. 12/016,018, 7 pages.
USPTO Office Action dated May 10, 2012 for U.S. Appl. No. 12/976,070, 31 pages.
USPTO Final Office Action dated May 9, 2012 for U.S. Appl. No. 12/508,281, 43 pages.
USPTO Office Action dated Jun. 7, 2012 for U.S. Appl. No. 12/534,356, 34 pages.
USPTO Supplemental Notice of Allowance dated Oct. 13, 2010 for U.S. Appl. No. 11/753,482, 4 pages.
USPTO Final Office Action dated Nov. 2, 2011 for U.S. Appl. No. 12/277,483, 12 pages.
USPTO Office Action dated Feb. 24, 2012 for U.S. Appl. No. 12/277,483, 19 pages.
USPTO Office Action dated Feb. 23, 2010 for U.S. Appl. No. 11/925,622, 19 pages.
USPTO Notice of Allowance dated Jul. 12, 2010 for U.S. Appl. No. 11/925,622, 6 pages.
USPTO Final Office Action dated Jul. 13, 2012 for U.S. Appl. No. 13/055,786, 7 pages.
PCT Search Report dated Apr. 23, 2009 regarding international application No. PCT/US2008/064427, 3 pages.
EPO Search Report dated Jul. 15, 2011 regarding Appl. No. 09756924.8-2124 (PCT/US2009065195), applicant's reference NAM/P116420EP00, applicant The Boeing Company, 8 pages.
Caspers et al., "Waveguide Mode Reflectometry for Obstacle Detection in the LHC Beam Pipe Including Signal Attenuation", Proceedings of the 2003 Particle Accelerator Conference, vol. 4, No. 12, May 2003, pp. 2700-2702.
Hatfield et al., "Electromagnetic Reverberation Characteristics of a Large Transport Aircraft", Naval Surface Warfare Center Dahlgren Division, NSWCDD/TR-93/339, Jul. 1994, 95 pages.
Hill et al., "Aperture Excitation of Electrically Large, Lossy Cavities", IEEE Transactions on Electromagnetic Compatibility, vol. 36, No. 3, Aug. 1994, pp. 169-178.
Partridge et al., "Manufacture and Performance of Z-Pinned Composites", Advance Polymeric Materials: Structure Property Relationships, CRC Press, Apr. 2003, pp. 98-137.
International Search Report and Written Opinion, dated Jan. 3, 2011, regarding Application No. PCT/US2010/036130 (WO2011011110), 16 pages.
Abbasi et al., "Microwave Nondestruction Detection of Longitudinal Cracks in Pipe with U-bend and Prediction of its Locatin by Signal Processing," In: Electromagnetic Nondestructive Evaluation (XI), Tamburrino et al. (Eds.), IOS Press, Oct. 2008, pp. 154-161.
Hladio et al., "A passive wireless displacement sensor for structural health monitoring of civil structures," SPIE Proceedings vol. 6531, Apr. 2007, pp. 653114.1-653114.7.
Shibata et al., "Experimental study on NDT method using electromagnetic waves," Journal of Materials Processing Technology, Vol. 161, No. 1-2, Apr. 2005, pp. 348-352.
Notice of Allowance, dated Oct. 15, 2012, regarding U.S. Appl. No. 12/976,070, 19 pages.
Notice of Allowance, dated Feb. 1, 2013, regarding U.S. Appl. No. 13/005,786, 22 pages.
Final Office Action, dated Aug. 6, 2012, regarding U.S. Appl. No. 12/277,483, 14 pages.
Notice of Allowance, dated Nov. 7, 2012, regarding U.S. Appl. No. 12/277,483, 7 pages.
Office Action, dated Nov. 7, 2012, regarding U.S. Appl. No. 12/508,281, 26 pages.
Final Office Action, dated Oct. 26, 2012, regarding U.S. Appl. No. 12/534,356, 28 pages.
Office Action, dated Mar. 1, 2013, regarding U.S. Appl. No. 12/508,281, 28 pages.
Notice of Allowance, dated Feb. 25, 2013, regarding U.S. Appl. No. 12/277,483, 20 pages.
Office Action, dated Apr. 19, 2012, regarding USPTO U.S. Appl. No. 12/534,356, 18 pages.

* cited by examiner

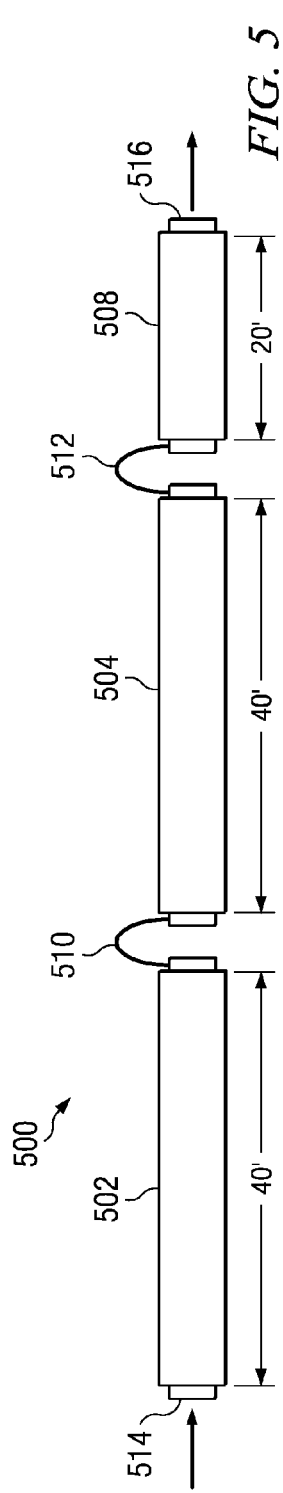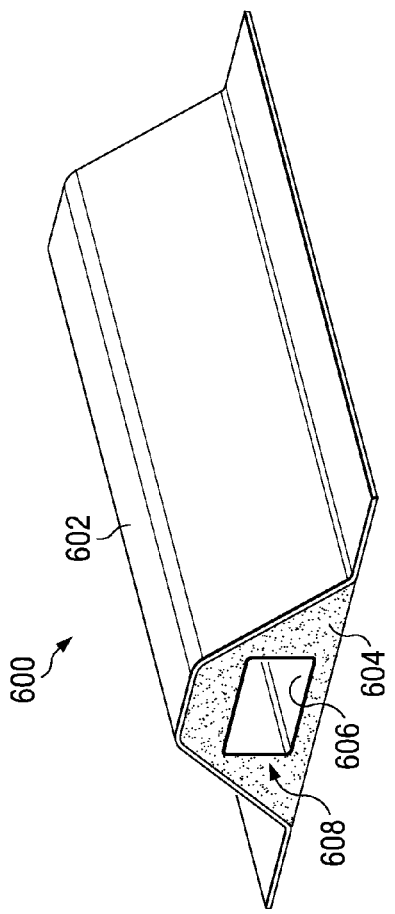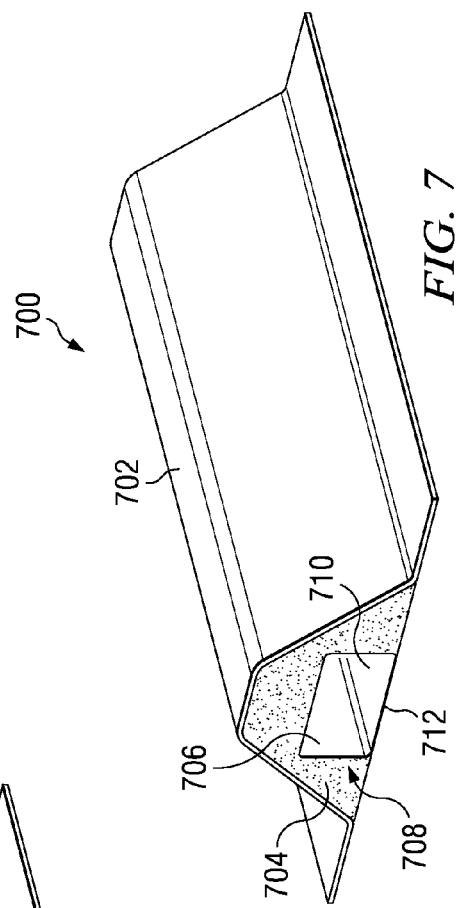

METHOD AND APPARATUS FOR WIRELESS AIRCRAFT COMMUNICATIONS AND POWER SYSTEM USING FUSELAGE STRINGERS

BACKGROUND INFORMATION

1. Field

The present disclosure relates generally to aircraft and, in particular, to network data processing systems in aircraft. Still more particularly, the present disclosure relates to a method and apparatus for a wireless communications and power system using stringers in a network data processing system in an aircraft.

2. Background

Aircraft contain many devices that use power and exchange information. These devices include, for example, without limitation, flight control computers, in-flight entertainment systems, line replaceable units, environmental control systems, sensors, and other suitable devices. Many of these devices may be non-critical and may require low amounts of power. Examples of these devices include a proximity sensor, a temperature sensor, an accelerometer, and/or some other suitable type of sensor. These sensors and other types of sensors may be used in a health monitoring system on an aircraft to perform health monitoring of the aircraft.

The sensors in a health monitoring system may monitor various conditions during the operation of an aircraft. For example, sensors monitor temperatures of various devices, vibrations, force, and/or other relevant conditions. This information is sent to a line replaceable unit or other type of data processing system in the health monitoring system. The information is analyzed to identify maintenance needs for the aircraft. As a result, these types of sensors add benefits including condition-based maintenance and increased safety.

Implementing a health monitoring system in an aircraft involves additional wiring used to provide the exchange of information and power between different devices in the health monitoring system. The wiring for a health monitoring system adds weight, cost, and/or maintenance burdens to an aircraft. These factors may reduce performance and/or increase operating costs.

Therefore, it would be advantageous to have a method and apparatus that takes into account one or more of the issues discussed above, as well as possibly other issues.

SUMMARY

In one advantageous embodiment, an apparatus comprises a stringer having a channel and a waveguide located within the channel. The waveguide is capable of carrying a number of wireless signals.

In another advantageous embodiment, an aircraft network data processing system comprises a plurality of composite stringers and a plurality of devices. The plurality of composite stringers is attached to a skin of an aircraft and is capable of carrying a number of wireless signals. The number of wireless signals is selected from at least one of an information signal and a power signal. Each stringer in the plurality of composite stringers comprises a composite material having a first channel, foam located in the first channel and having a second channel, and a waveguide located in the second channel. The plurality of devices is associated with the plurality of composite stringers and is capable of exchanging the number of wireless signals carried in the plurality of composite stringers.

In yet another advantageous embodiment, a method is present for transmitting wireless signals in a vehicle. A number of wireless signals are transmitted from a first device into a number of waveguides located in a number of stringers in the vehicle. The number of wireless signals is carried in the number of waveguides in the number of stringers. The number of wireless signals is received from the number of waveguides at a second device.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 5 is a diagram illustrating composite stringers connected to each other in a network in accordance with an advantageous embodiment;

FIG. 6 is a diagram illustrating a cross-sectional perspective view of a hat-shaped stringer with a waveguide in accordance with an advantageous embodiment;

FIG. 7 is a diagram of a cross-sectional perspective view of a portion of a composite stringer in accordance with an advantageous embodiment;

DETAILED DESCRIPTION

Figure 1:
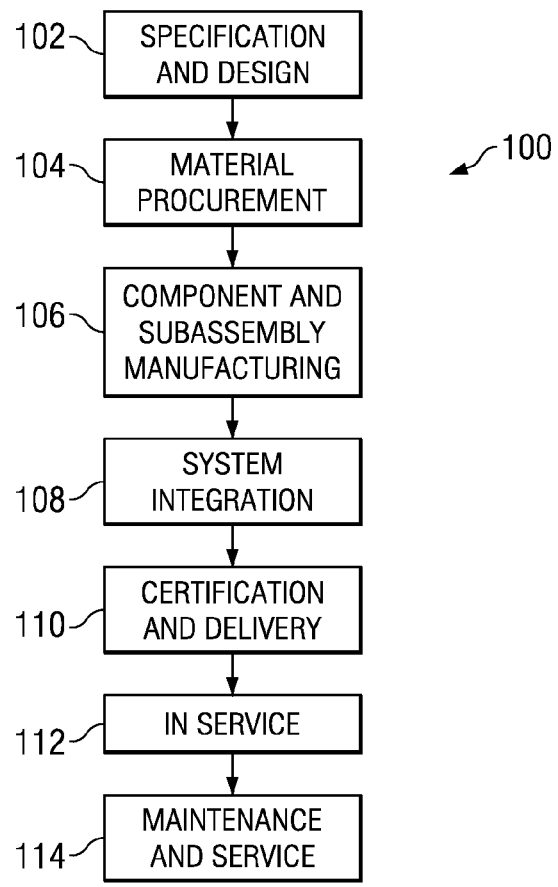
FIG. 1 is a diagram illustrating an aircraft manufacturing and service method in accordance with an advantageous embodiment.
Figure 2:
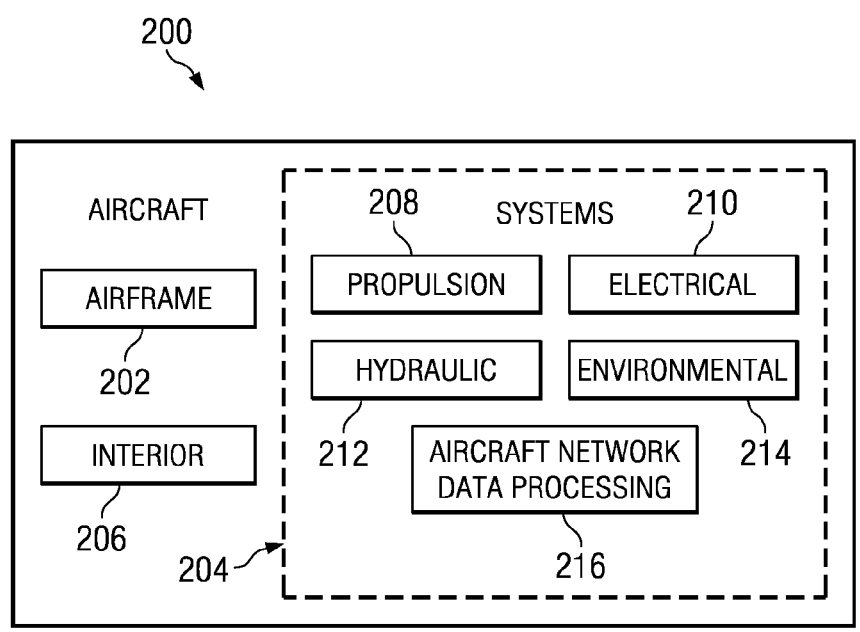
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and aircraft network data processing system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more apparatus embodiments, method embodiments, or a combination thereof may be utilized while aircraft 200 is in service 112 or during maintenance and service 114 in FIG. 1.

As an illustrative example, in one or more advantageous embodiments, an aircraft network data processing system, such as aircraft network data processing system 216, may be implemented during system integration 108 in FIG. 1. Aircraft network data processing system 216 may be used to distribute information and power.

This type of network may include, for example, without limitation, a health monitoring system, a flight control system, an in-flight entertainment system, an environmental control system, and/or any other type of system which exchanges information and/or power in aircraft 200. In yet other advantageous embodiments, aircraft network data processing system 216 may be implemented during maintenance and service 114 in FIG. 1. During maintenance and service 114, upgrades to aircraft 200 may be performed to include aircraft network data processing system 216.

The different advantageous embodiments recognize and take into account a number of different considerations. For example, the different advantageous embodiments recognize and take into account that wireless networks may be used to distribute information and power within an aircraft. The different advantageous embodiments, however, recognize that this type of system may have a number of different problems. For example, with a wireless network using transmitters and repeaters within a cabin or fuselage, interference may occur. For example, without limitation, people, galley carts, and/or other items may interfere with the propagation of wireless signals within the aircraft.

The different advantageous embodiments recognize and take into account that increased power may be needed to transmit the signals for information and power when these signals are transmitted within the cabin or other open areas of the fuselage. These types of signals may cause interference with other devices and/or signals.

Thus, the different advantageous embodiments provide a method and apparatus for distributing signals within an aircraft. In one advantageous embodiment, a stringer in the aircraft has a channel. A waveguide is located within the channel. The waveguide is capable of carrying a number of signals. In other words, the waveguide is configured to carry the number of signals. The number of signals is selected from at least one of an information signal and a power signal in the illustrative examples.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Figure 3:
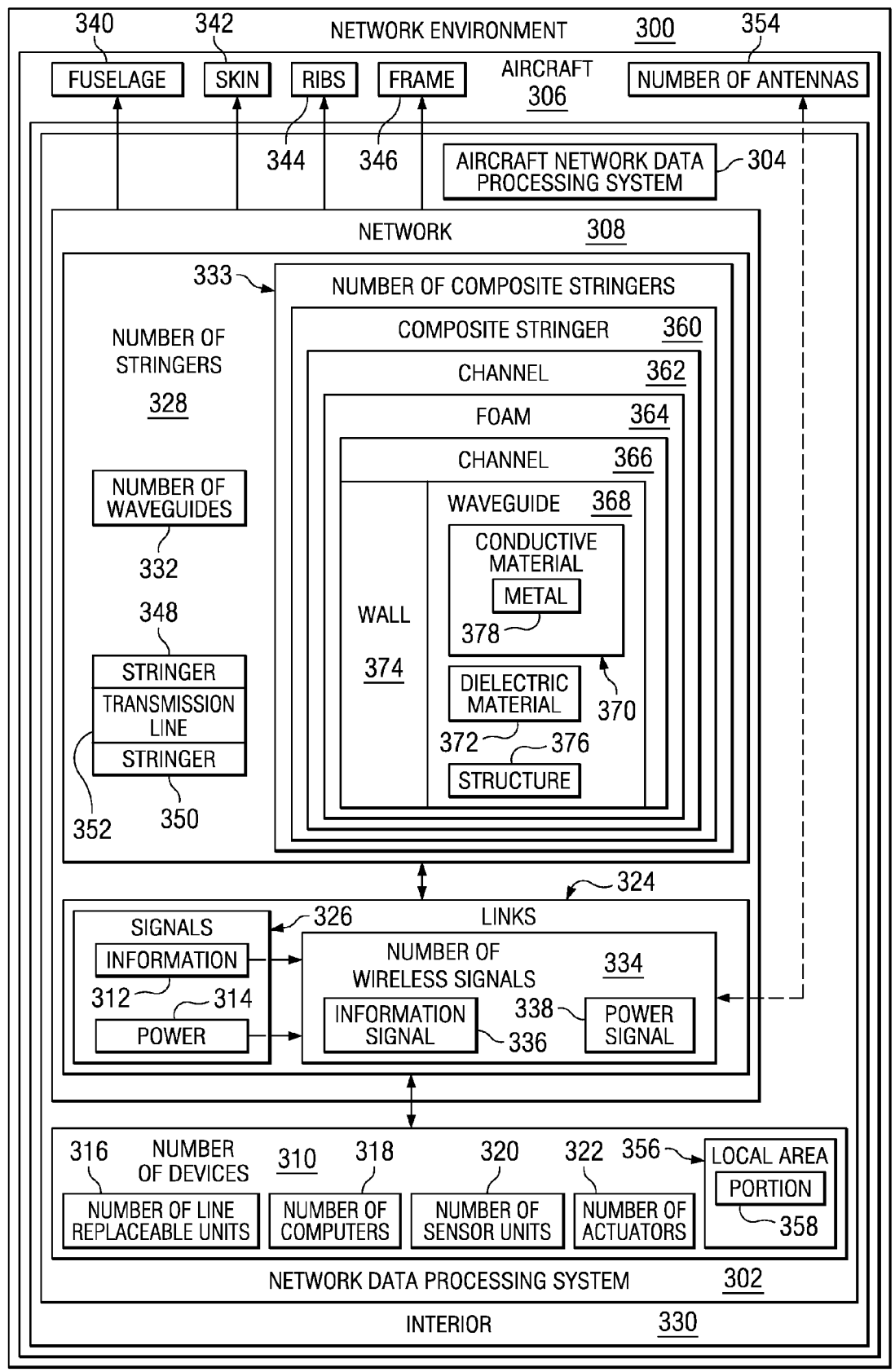
FIG. 3 is a diagram of a network environment in accordance with an advantageous embodiment.

With reference now to FIG. 3, a diagram of a network environment is depicted in accordance with an advantageous embodiment. In this illustrative example, network environment 300 may include network data processing system 302. Network data processing system 302 may take the form of aircraft network data processing system 304 located within aircraft 306 in network environment 300.

Network data processing system 302 has network 308 to which number of devices 310 is associated. Number of devices 310 may be any device capable of transmitting and/or receiving at least one of information 312 and power 314 using network 308. A device in number of devices 310 may be associated with network 308 if the device is capable of transmitting and/or receiving at least one of information 312 and power 314 using network 308.

Information 312 may contain information such as, for example, data, commands, programs, and/or other suitable information. Power 314 may be used to power number of devices 310. A number, as used herein, with reference to items, refers to one or more items. For example, number of devices 310 is one or more devices. In these illustrative examples, number of devices 310 may be, for example, without limitation, number of line replaceable units 316, number of computers 318, number of sensor units 320, number of actuators 322, and/or any other suitable type of device.

Network 308 is a medium that provides links 324 between number of devices 310. Links 324 may carry information 312 and/or power 314. Links 324 may be facilitated by wires, wireless communication links, fiber optic cables, transmission lines, air interfaces, and/or other suitable types of components. Information 312 and power 314 may be transmitted or carried within links 324 as signals 326.

In the different illustrative examples, at least a portion of links 324 may be provided using number of stringers 328.

Number of stringers 328 may be located in interior 330 of aircraft 306. Number of stringers 328 may have number of waveguides 332.

In these illustrative examples, number of stringers 328 may take the form of number of composite stringers 333. In these illustrative examples, number of waveguides 332 and number of stringers 328 may carry signals 326 in the form of number of wireless signals 334. Number of wireless signals 334 may include at least one of information signal 336 and power signal 338.

In these illustrative examples, number of stringers 328 may be connected to structures within aircraft 306 such as, for example, without limitation, fuselage 340, skin 342, ribs 344, frame 346, and/or other suitable structures within aircraft 306. Number of stringers 328 may be noncontiguous. In other words, number of stringers 328, when more than one stringer is present, may not be connected to each other within network 308.

As a result, number of stringers 328 may be connected to each other to form network 308. Further, within network 308, if more than one stringer is present within number of stringers 328, these stringers may be connected to each other. For example, without limitation, stringer 348 and stringer 350 in number of stringers 328 may be connected to each other using transmission line 352. Transmission line 352 may be, for example, without limitation, any structure capable of conducting information signal 336 and/or power signal 338. For example, without limitation, transmission line 352 may be a coaxial cable, an optical cable, and/or some other suitable type of cable.

In some illustrative examples, number of antennas 354 may be connected to number of stringers 328 to transmit number of wireless signals 334 into local area 356 in which portion 358 of number of devices 310 may be located. Local area 356 may be any location within aircraft 306. For example, local area 356 may be in a crown of the cabin, between the skin panel in an interior wall of the cabin in aircraft 306, and/or some other suitable location.

In the illustrative examples, composite stringer 360 is an example of a stringer within number of composite stringers 333. Composite stringer 360 may have channel 362. Foam 364 may be located within channel 362. Additionally, foam 364 also may have channel 366.

Waveguide 368 is an example of a waveguide within number of waveguides 332 and is located within channel 366. Waveguide 368 may be comprised of conductive material 370 and/or dielectric material 372. Depending on the particular implementation, waveguide 368 may be attached to wall 374 of channel 366. Of course, in other advantageous embodiments, waveguide 368 may take the form of structure 376 located within channel 366.

When waveguide 368 takes the form of conductive material 370, conductive material 370 may be metal 378. As a specific example, metal 378 may be a coating applied to wall 374, a foil, a sheet, or some other suitable form of metal 378. In these illustrative examples, metal 378 may be, for example, without limitation, a copper foil. Metal 378 may be attached to wall 374 through a number of different mechanisms. For example, without limitation, metal 378 may be applied using conductive paint, electrolysis metal vapor deposition, and/or other suitable mechanisms.

The illustration of network environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, network 308 may contain only number of stringers 328. Further, some stringers within number of stringers 328 may not include waveguides. As another example, in some advantageous embodiments, only information 312 may be distributed through network 308. In other advantageous embodiments, a stringer within number of stringers 328 may contain multiple waveguides.

In the illustrative examples, waveguide 368 is located within channel 362 for composite stringer 360. In these depicted examples, waveguide 368 is located within channel 366 within foam 364, which is located within channel 362. In other advantageous embodiments, waveguide 368 may be located within channel 362 in composite stringer 360 without foam 364. For example, waveguide 368 may be formed in channel 362 using conductive material 370 and/or dielectric material 372.

Figure 4:
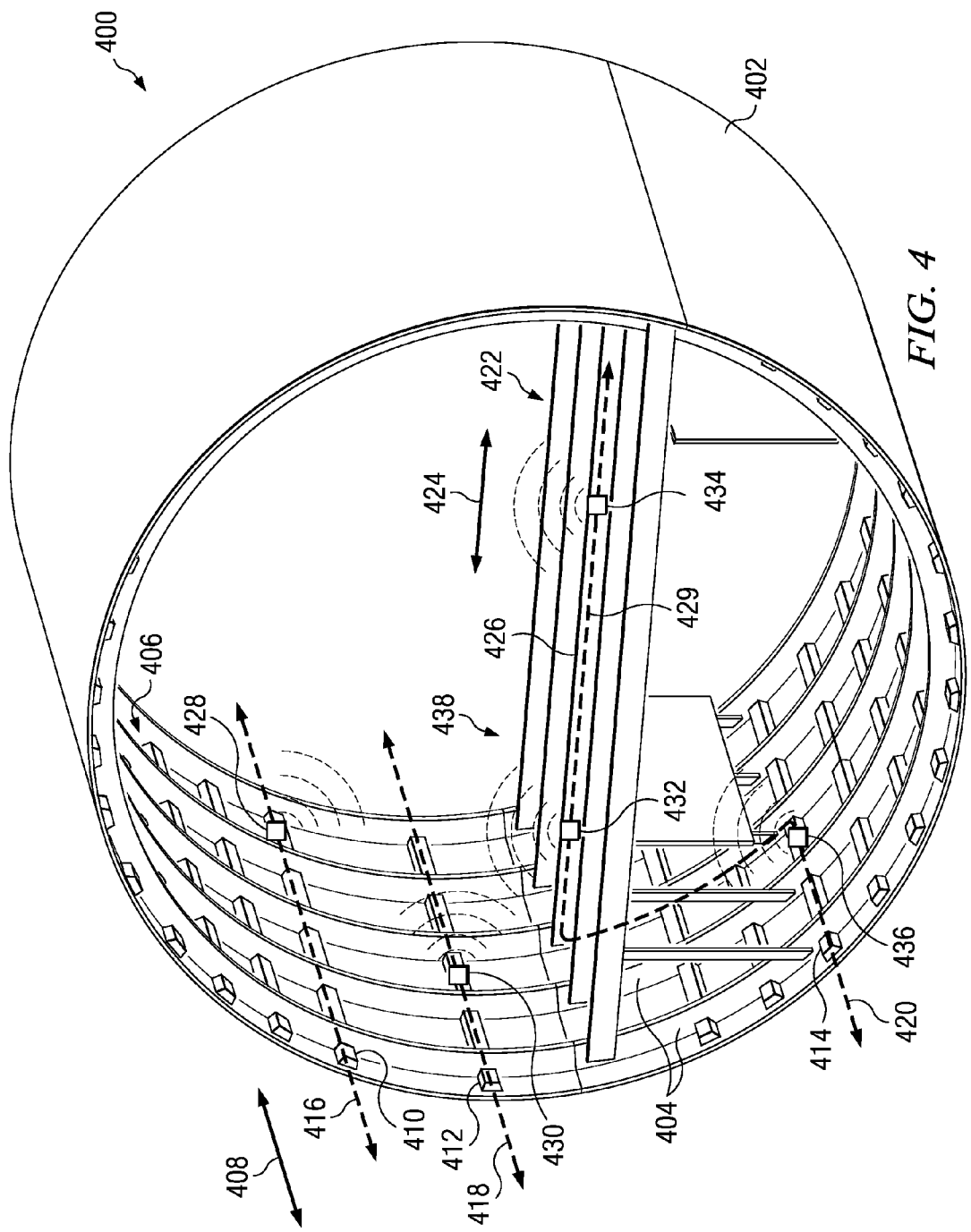
FIG. 4 is a diagram illustrating a portion of a fuselage of an aircraft in accordance with an advantageous embodiment.

Turning now to FIG. 4, a diagram illustrating a portion of a fuselage of an aircraft is depicted in accordance with an advantageous embodiment. In this illustrative example, fuselage 400 is an example of a portion of a fuselage in aircraft 200 in FIG. 2.

Fuselage 400 has skin 402, which may be supported by structures, such as ribs 404. Stringers 406 may interconnect and/or run through ribs 404 in the direction of arrow 408. In these illustrative examples, one or more of stringers 406 may have waveguides and carry wireless signals.

For example, stringers 410, 412, and 414 are attached to skin 402 and carry wireless signals 416, 418, and 420. Additionally, stringers 422 also may extend in the direction of arrow 424 within fuselage 400. In this illustrative example, stringer 426 carries wireless signal 429. These different wireless signals may be, for example, information signals and/or power signals.

Further, access points 428, 430, 432, 434, and 436 may provide access points to stringers 410, 412, 414, and 426 to transmit wireless signals 416, 418, 420, and 429 outside of the waveguides in these stringers. Access point 428 is integrated or located on stringer 410. Access point 430 is located on stringer 412, and access point 436 is located on stringer 414. Access points 432 and 434 are located on stringer 426 in this illustrative example. These components form network 438 in fuselage 400. Network 438 is an example of a network, such as network 308 in FIG. 3.

With reference now to FIG. 5, a diagram illustrating composite stringers connected to each other in a network is depicted in accordance with an advantageous embodiment. In this illustrative example, network 500 is an example of one implementation of network 308 in FIG. 3. Network 500 may be comprised of composite stringer 502, composite stringer 504, and composite stringer 508. Composite stringers 502, 504, and 508 are examples of composite stringers that may be connected to each other within number of stringers 328 in FIG. 3.

These composite stringers are connected to each other using transmission lines 510 and 512. The connection of these composite stringers in network 500 may form a bus. In this illustrative example, composite stringer 502 is connected to composite stringer 504 by transmission line 510. Composite stringer 504 is connected to composite stringer 508 by transmission line 512.

Input 514 provides an input for a signal from a radio frequency generator in these illustrative examples. Wireless signals may be transmitted through the waveguides in composite stringers 502, 504, and 508 to output 516, which may be connected to a sensor either by a transmission line or a wireless interface.

Turning now to FIG. 6, a diagram illustrating a cross-sectional perspective view of a hat-shaped stringer with a waveguide is depicted in accordance with an advantageous embodiment. Composite stringer 600 is an example of an implementation of composite stringer 360 in FIG. 3.

In this illustrative example, composite stringer 600 has a hat-shape. Composite stringer 600 is comprised of composite material 602, foam 604, and conductive material 606 for waveguide 608. In this illustrative example, waveguide 608 is a rectangular waveguide. Of course, other shapes for waveguide 608 may be selected. For example, waveguide 608 may be rectangular, oval, circular, or some other suitable shape.

With reference next to FIG. 7, a diagram of a cross-sectional perspective view of a portion of a composite stringer is depicted in accordance with an advantageous embodiment. In this example, composite stringer 700 is an example of another implementation for composite stringer 360 in FIG. 3.

In this illustrative example, composite stringer 700 comprises composite material 702, foam 704, and conductive material 706, which forms a structure for waveguide 708. In this example, conductive material 706 on side 710 of waveguide 708 may be formed against skin panel 712.

The examples of composite stringers illustrated in FIGS. 6-7 may employ conductive materials in various forms as described above. For example, without limitation, if copper foil was used, an adhesive film or some other form of adhesive may be applied to the copper foil. This adhesive film may be used to adhere the copper foil to the foam during the curing process.

Further, the illustrative examples show that the waveguides do not need to be completely encompassed within the foam. For example, in FIG. 7, portions of the waveguide may be located against a composite material for the stringer or against skin panel 712. Also, although only a single waveguide is illustrated in these examples, other advantageous embodiments may employ more than one waveguide that extends through the stringer.

Figure 8:
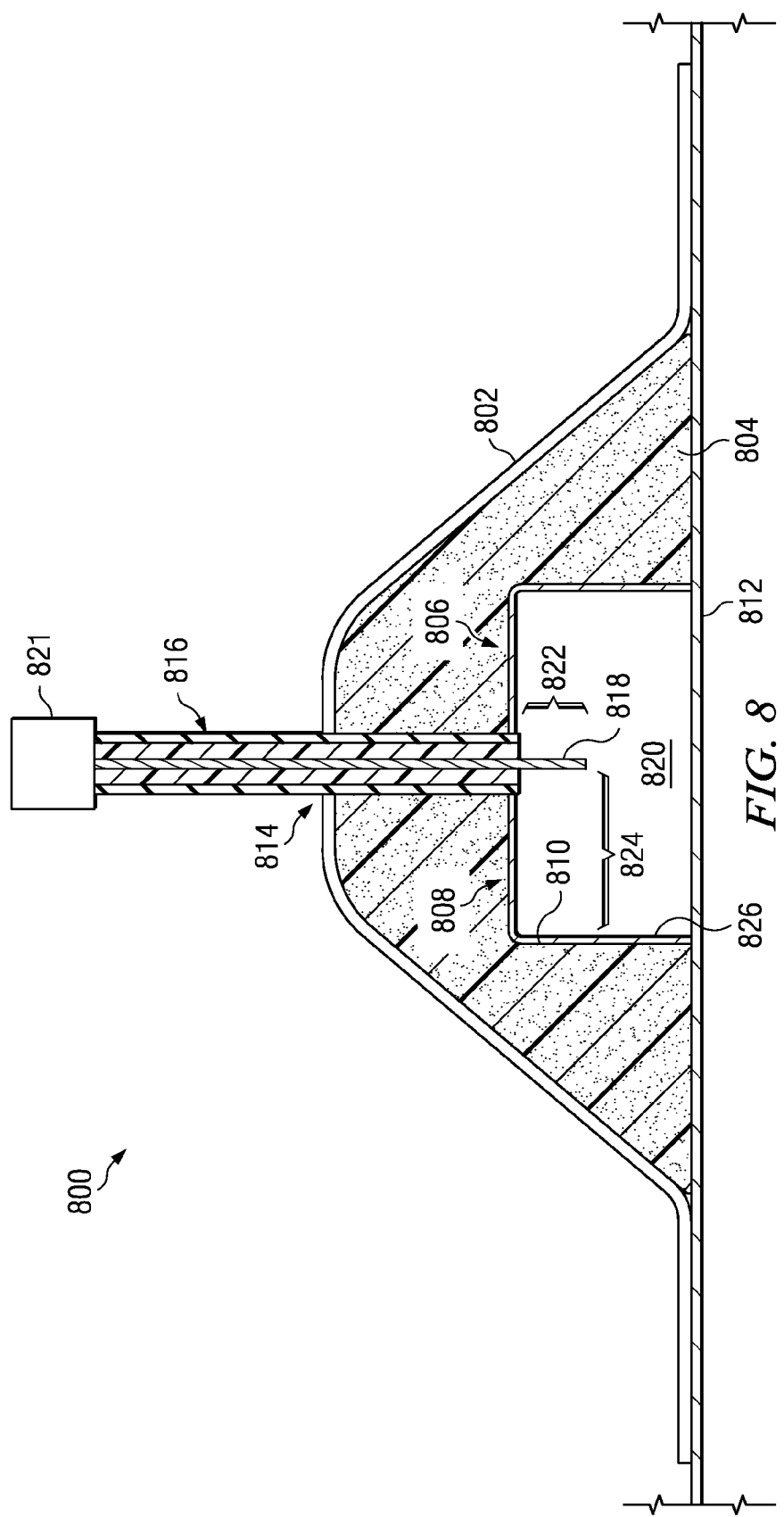
FIG. 8 is a diagram illustrating a cross-sectional view of a waveguide with an access point in accordance with an advantageous embodiment.

Turning now to FIG. 8, a diagram illustrating a cross-sectional view of a waveguide with an access point is depicted in accordance with an advantageous embodiment. Composite stringer 800 may be used to implement composite stringers such as, for example, composite stringers 502, 504, and 508 in FIG. 5. In this illustrative example, composite stringer 800 comprises composite material 802, foam 804, and conductive material 806 for waveguide 808.

Conductive material 806 may be placed against wall 810 of foam 804 and skin panel 812. Access point 814 may be created using coaxial cable 816. Coaxial cable 816 may have center conductor 818 extend into cavity 820 of waveguide 808. Center conductor 818 allows for a propagation of waves within cavity 820 to travel through coaxial cable 816. Coaxial cable 816 may terminate in component 821. Coaxial cable 816, with center conductor 818, is an example a transmission line used as a probe in cavity 820. Component 821 may be another device, antenna, stringer, or some other suitable component. In other advantageous embodiments, an antenna may be integrated and/or placed into cavity 820 to form access point 814.

Distance 822 may be a distance that center conductor 818 extends into cavity 820. Distance 824 may be a distance from wall 826 to center conductor 818. These distances may be determined, in the illustrative examples, using a computer program to optimize the electrical performance of the coax-waveguide interface for the desired frequency range and selected waveguide size.

Figure 9:
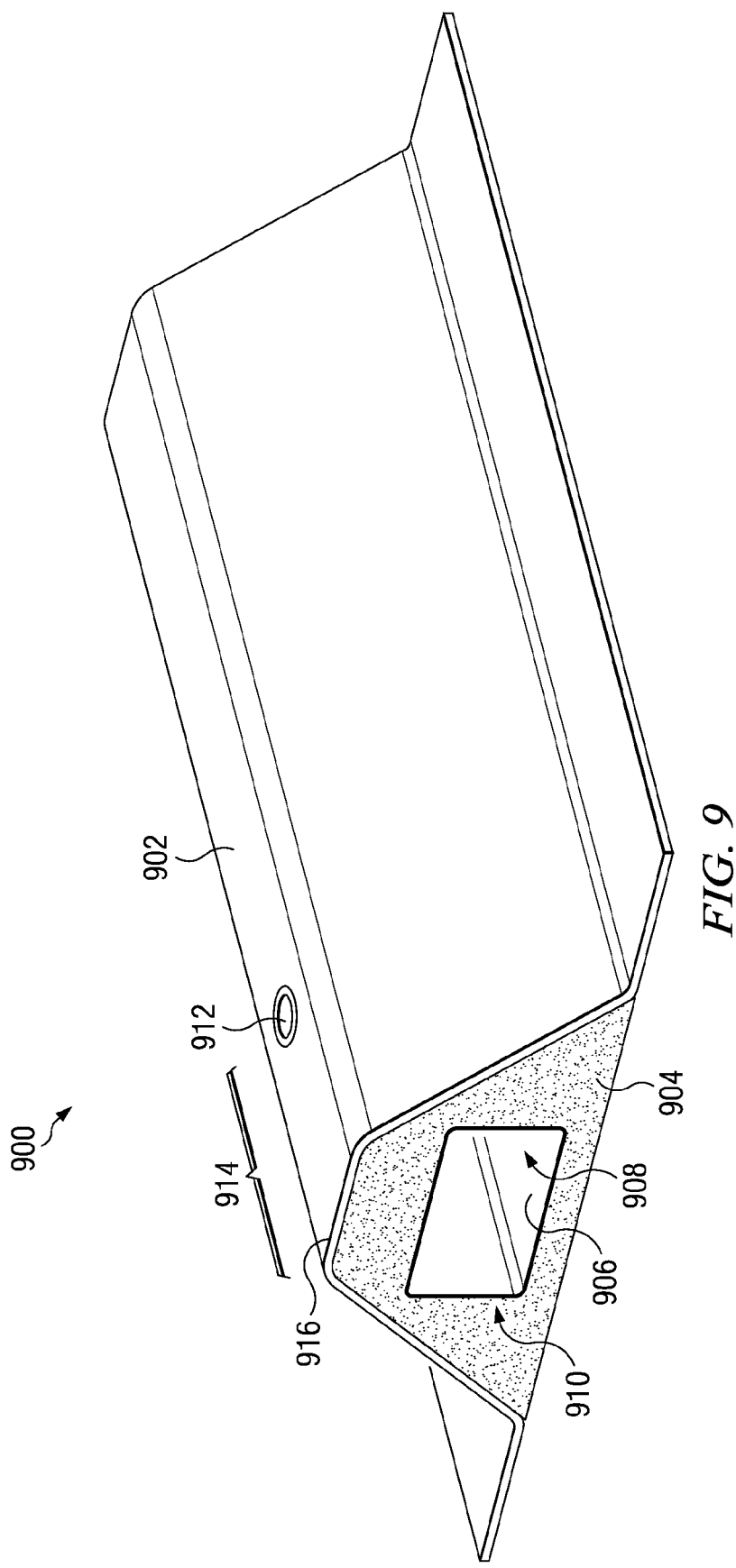
FIG. 9 is a diagram of a composite stringer with a location for an access point in accordance with an advantageous embodiment.

With reference now to FIG. 9, a diagram of a composite stringer with a location for an access point is depicted in accordance with an advantageous embodiment. In this illustrative example, composite stringer 900 is an example of an implementation of composite stringer 360 in FIG. 3.

Composite stringer 900 may be comprised of composite material 902, foam 904, and conductive material 906. Conductive material 906 is located in channel 908 of foam 904 and forms waveguide 910 within composite stringer 900. In this illustrative example, plated hole 912 may be located at distance 914 from end 916 of composite stringer 900. Distance 914 may be determined by using a computer program to optimize the electrical performance of the coax-waveguide interface for the desired frequency range and selected waveguide size. The probe of FIG. 8 may be inserted in plated hole 912.

Figure 10:
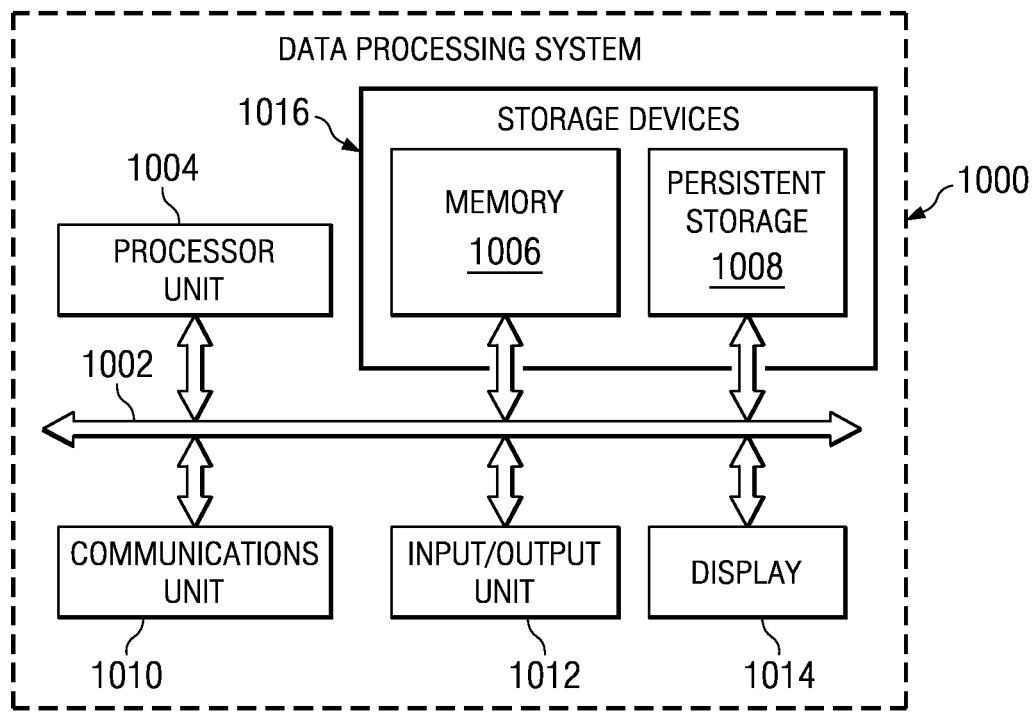
FIG. 10 is a diagram of a data processing system in accordance with an advantageous embodiment.

Turning now to FIG. 10, a diagram of a data processing system is depicted in accordance with an advantageous embodiment. Data processing system 1000 is an example of a device that may be present in number of devices 310 in FIG. 3. In particular, data processing system 1000 may be used to implement devices such as, for example, without limitation, number of line replaceable units 316 and number of computers 318 in FIG. 3.

Data processing system 1000 may receive information from number of sensor units 320 and/or other devices within number of devices 310 in FIG. 3. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 executes instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example without limitation, data, program code in functional form, and/or other suitable information either on a temporary basis and/or a permanent basis.

Memory 1006, in these examples, may be, for example, a random access memory or any other suitable volatile or non-volatile storage device. Persistent storage 1008 may take various forms, depending on the particular implementation. For example, persistent storage 1008 may contain one or more components or devices. For example, persistent storage 1008 may be a hard drive, a flash memory, a rewritable optical disk, a rewritable magnetic tape, or some combination of the above.

Communications unit 1010, in these examples, provides for communications with other data processing systems or devices. In these examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or tangible computer readable media, such as memory 1006 or persistent storage 1008.

The illustrations of data processing system 1000 in FIG. 10 is not meant to imply physical or architectural limitations to the manner in which different devices may be implemented. Other sensor units and data processing systems may include other components in addition to or in place of the ones illustrated. Further, some advantageous embodiments may exclude some of the components illustrated. For example, in some advantageous embodiments, display 1014 in data processing system 1000 may be unnecessary.

Figure 11:
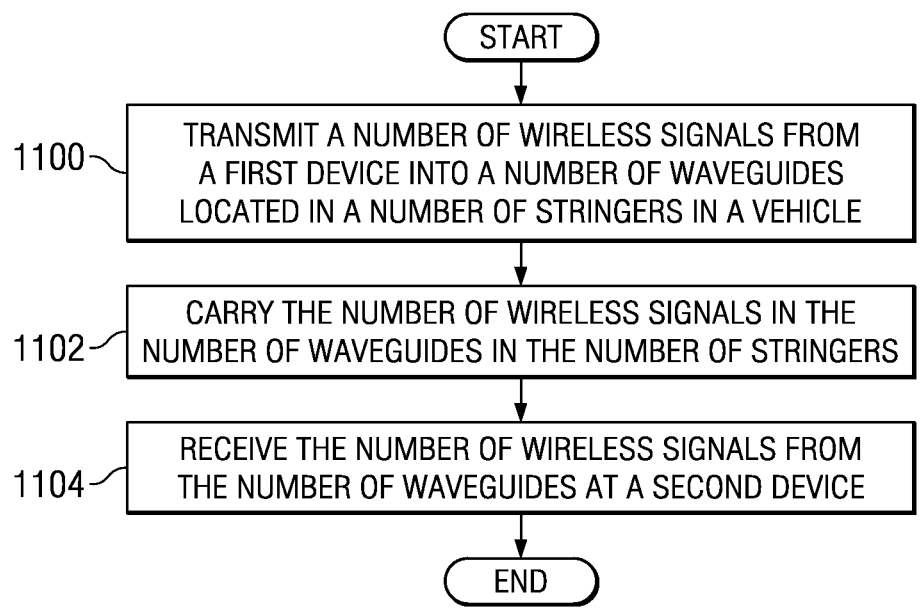
FIG. 11 is a flowchart of a process for transmitting wireless signals in a vehicle in accordance with an advantageous embodiment.

With reference now to FIG. 11, a flowchart of a process for transmitting wireless signals in a vehicle is depicted in accordance with an advantageous embodiment. The process illustrated in FIG. 11 may be implemented in a network environment, such as network environment 300 in FIG. 3. More specifically, the process illustrated in this figure may be implemented in network data processing system 302 in FIG. 3 in a vehicle. This vehicle may take various forms, such as aircraft 306 in FIG. 3.

The process begins by transmitting a number of wireless signals from a first device into a number of waveguides located in a number of stringers in a vehicle (operation 1100). These wireless signals may be transmitted into a waveguide in the number of waveguides in operation 1100 by the first device. This transmission may be made through a cable or other connector connecting the first device to the waveguide.

Alternatively, the first device may transmit the number of wireless signals through an air interface, which is received at an antenna connected to the waveguide. In this manner, the first device is associated with this waveguide. The association, as illustrated in this example, may be a physical connection or a wireless connection that allows for transmission of the wireless signals from the first device into the waveguide in the number of waveguides. In this manner, these wireless signals may be transmitted into the waveguide.

The process then carries the number of wireless signals in the number of waveguides in the number of stringers (operation 1102). The number of wireless signals is received from the number of waveguides at a second device (operation 1104), with the process terminating thereafter. In this illustrative example, the number of wireless signals may be sent to the second device, which is associated with the number of waveguides.

The second device is associated with the number of waveguides by being able to receive the wireless signals from one or more of the number of waveguides. As with the first device, the second device may be connected to one or more of the waveguides at an access point. In other advantageous embodiments, the access point may have an antenna that radiates the wireless signals into an air interface that may be received by the second device.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for transmitting wireless signals. In one advantageous embodiment, an apparatus comprises a stringer having a channel. A waveguide is located within the channel in which the waveguide is capable of carrying a number of wireless signals.

In the different advantageous embodiments, the stringer may take the form of a composite stringer having a foam core in which the waveguide is located within a channel in the foam core. These stringers may be located in the interior of an aircraft. The stringers may be located along the skin panels of the aircraft or extend across the fuselage of the aircraft.

By incorporating waveguides into these stringers, the different advantageous embodiments provide a capability to transmit information and/or power through these waveguides to different devices. With the use of these stringers, additional weight, complexity, and/or expense may be decreased. These waveguides may be built into the aircraft during the manufacturing of the aircraft. In some advantageous embodiments, these types of stringers may be added to the aircraft during maintenance as an upgrade or refurbishment of aircraft.

Further, the use of stringers containing waveguides also reduces the amount of power needed to transmit wireless signals. The design of the waveguides may be such to allow for low power usage as compared to currently available wireless systems. Also, with one or more of the different advantageous embodiments, the interference and/or reduction of power signals may be avoided as compared to the transmission of wireless signals through the cabin of an aircraft in which obstructions, such as people or carts, may be present.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also may be applied to other types of structures. For example, without limitation, the different advantageous embodiments may be applied to vehicles, such as a spacecraft, a submarine, a surface ship, and/or some other suitable type of vehicle. The different advantageous embodiments may even be applied to structures that are stationary or non-mobile in addition to vehicles.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a stringer comprising:
  a first channel;
  a composite part;
 foam located within the first channel, wherein a second channel is within the foam; and
 a waveguide located within the second channel, wherein the waveguide is capable of carrying a number of wireless signals; and
 a conductive material in the second channel, wherein the conductive material forms the waveguide.

2. The apparatus of claim 1, wherein the number of wireless signals is selected from at least one of an information signal and a power signal.

3. The apparatus of claim 1 further comprising:
 a plurality of devices associated with the stringer, wherein the plurality of devices is capable of exchanging the number of wireless signals carried in the waveguide.

4. The apparatus of claim 3, wherein the plurality of devices is selected from at least one of a computer, a line replaceable unit, a sensor, and an actuator.

5. The apparatus of claim 1, wherein the stringer is capable of being attached to one of a skin on a fuselage of an aircraft, a skin on a wing of the aircraft, a frame of the aircraft, and a rib of the aircraft.

6. The apparatus of claim 3, wherein the plurality of devices and the stringer are part of a network data processing system.

7. The apparatus of claim 6, wherein the network data processing system is located in a vehicle.

8. The apparatus of claim 6, wherein the network data processing system is selected from at least one of a health monitoring system, a flight control system, an in-flight entertainment system, and an environmental control system.

9. The apparatus of claim 7, wherein the vehicle is selected from one of an aircraft, a spacecraft, a submarine, and a surface ship.

10. The apparatus of claim 1 further comprising:
 a number of stringers, wherein each of the number of stringers has an associated waveguide.

11. The apparatus of claim 1 further comprising:
 an access point to the waveguide.

12. The apparatus of claim 11, wherein the access point comprises one of a transmission line, a probe, and an antenna.

13. The apparatus of claim 1, wherein the waveguide comprises a metal material attached to a wall of the second channel.

14. The apparatus of claim 1 further comprising:
 an aircraft, wherein the stringer is attached to an interior of the aircraft.

15. An aircraft network data processing system comprising:
 a plurality of composite stringers attached to a skin of an aircraft and capable of carrying a number of wireless signals selected from at least one of an information and a power signal,
 wherein each stringer in the plurality of composite stringers comprises
  a composite material having
   a first channel,
   foam located in the first channel and having
    a second channel,
   a waveguide located in the second channel,
   a conductive material in the second channel, wherein the conductive material forms the waveguide; and
 a plurality of devices associated with the plurality of composite stringers and capable of exchanging the number of wireless signals carried by the plurality of composite stringers.

16. The aircraft network data processing system of claim 15, wherein the aircraft network data processing system comprises at least one of a health monitoring system, a flight control system, an in-flight entertainment system, and an environmental control system.

17. A method of transmitting wireless signals in a vehicle, the method comprising:
 transmitting a number of wireless signals from a first device into a number of waveguides located in a number of stringers in the vehicle;
 carrying the number of wireless signals in the number of waveguides in the number of stringers; and
 receiving the number of wireless signals from the number of waveguides at a second device;
 wherein each stringer of the number of stringers comprises:
  a first channel;
  a composite part;
  foam located within the first channel,
   wherein a second channel is within the foam,
    wherein a waveguide of the number of waveguides is located
   within the second channel; and
  a conductive material in the second channel,
   wherein the conductive material forms the waveguide.

18. The method of claim 17, wherein the number of wireless signals is selected from at least one of an information signal and a power signal.

19. The method of claim 17, wherein the first device and the second device are selected from at least one of a computer, a sensor, an actuator, and a line replaceable unit.

20. The method of claim 17, wherein a transmission line connects a first stringer in the number of stringers with a second stringer in the number of stringers.

21. The method of claim 17, wherein a number of devices in addition to the first device and the second device are present in the vehicle.

22. The method of claim 17, wherein the number of waveguides in the number of stringers are part of a network in the vehicle, and wherein the network further comprises at least one of a number of transmission lines, a number of optical cables, and a number of air interfaces.

23. The method of claim 2,
 wherein the information signal comprises one or more of data, commands, and programs; and
 wherein the power signal powers a number of devices.

* * * * *